(12) United States Patent
Sweet-Kirkwood et al.

(10) Patent No.: US 12,280,406 B2
(45) Date of Patent: Apr. 22, 2025

(54) CLEANING SYSTEM

(71) Applicant: Drumblaster Technology Pty Ltd, Bundamba (AU)

(72) Inventors: Jonathan Sweet-Kirkwood, North Melbourne (AU); Leon Muller, Sunbury (AU)

(73) Assignee: Drumblaster Technology Pty Ltd, Bundamba (AU)

( * ) Notice: Subject to any disclaimer, the term of this patent is extended or adjusted under 35 U.S.C. 154(b) by 390 days.

(21) Appl. No.: 17/631,906

(22) PCT Filed: Jun. 19, 2020

(86) PCT No.: PCT/AU2020/050622
§ 371 (c)(1),
(2) Date: Feb. 1, 2022

(87) PCT Pub. No.: WO2021/022317
PCT Pub. Date: Feb. 11, 2021

(65) Prior Publication Data
US 2022/0288657 A1    Sep. 15, 2022

(30) Foreign Application Priority Data
Aug. 2, 2019 (AU) ................................ 2019902778

(51) Int. Cl.
*B08B 9/08* (2006.01)
*B01F 35/10* (2022.01)
*B60S 3/00* (2006.01)

(52) U.S. Cl.
CPC ........ *B08B 9/0813* (2013.01); *B01F 35/1453* (2022.01); *B60S 3/008* (2013.01); *B08B 2209/08* (2013.01)

(58) Field of Classification Search
CPC ............... B08B 9/0813; B08B 2209/08; B01F 35/1453; B60S 3/008
(Continued)

(56) References Cited

U.S. PATENT DOCUMENTS

| 9,370,801 B1 | 6/2016 | Short, Jr. et al. |
| 2006/0289037 A1 | 12/2006 | Shook |
| 2019/0184946 A1 | 6/2019 | Friederich et al. |

FOREIGN PATENT DOCUMENTS

| CN | 1781778 | 6/2006 |
| EP | 3556481 A1 | 10/2019 |

OTHER PUBLICATIONS

CN1781778A—machine translation (Year: 2006).*
(Continued)

*Primary Examiner* — Tinsae B Ayalew
(74) *Attorney, Agent, or Firm* — Duane Morris LLP (57) ABSTRACT

A cleaning system for washing an internal surface of a container located on a vehicle, the cleaning system comprising an elongate boom with at least one nozzle located at a first end of the boom, a support assembly for supporting the boom, wherein the boom is movable with respect to the support assembly, a controller configured to control movement of the boom, and a vehicle identification system comprising an identification reader configured to identify the vehicle and communicate with the controller, wherein one or more parameters of the vehicle can be stored on or retrieved from the vehicle identification system upon identifying the vehicle, and wherein the boom is configured to extend into the container to wash the internal surface based on the one or more parameters.

18 Claims, 7 Drawing Sheets

(58) Field of Classification Search
USPC .................................................. 134/167 R
See application file for complete search history.

(56) References Cited

OTHER PUBLICATIONS

Extended European Search Report issued on Aug. 10, 2023 for corresponding European Patent Application No. 20849691.9.
International Search Report Issued Aug. 11, 2020 For Corresponding PCT Application No. PCT/AU2020/050622.

* cited by examiner

CLEANING SYSTEM

CROSS REFERENCE TO RELATED APPLICATIONS

This application is a National Stage Application, filed under 35 U.S.C. 371, of International Patent Application No. PCT/AU2020/050622, filed on Jun. 19, 2020, which claims priority to Australian Patent Application No. 2019902778 filed on Aug. 2, 2019, contents of both of which are incorporated herein by reference in their entireties.

FIELD OF THE INVENTION

The invention relates to a cleaning system. In particular, the invention relates, but is not limited, to a cleaning system for washing an internal surface of a container, such as a concrete mixing bowl, located on a vehicle.

BACKGROUND TO THE INVENTION

Reference to background art herein is not to be construed as an admission that such art constitutes common general knowledge in Australia or elsewhere.

Vehicles for transporting pre-mixed concrete typically have a container in the form of a rotatable drum such that rotation of the drum mixes the concrete and/or prevents it from setting during transportation. During normal operation of the drum, residual concrete accumulates and hardens within the drum. This residual hardened concrete reduces the capacity of the drum, adds weight to the vehicle and can reduce the efficiency of the drum to mix and move the concrete.

Known methods for removing the hardened residual concrete include, amongst other methods, having a worker enter the drum using a jackhammer to chip and break concrete from the internal surface of the drum and mixing fins. This is a time consuming task which is very hazardous to the worker, particularly in such a confined space. Additionally, there is a high potential for the internal surface and fins of the drum to be damaged. To improve safety, manually operated cleaning apparatus that extends into the drum may be used. However, the efficiency and effectiveness of such cleaning methods rely on the skill and performance of the operator, thereby often resulting in inconsistent or unsatisfactory results. Further, human error may lead to the damage to the cleaning apparatus and/or the internal surface of the bowl (including any components located in the bowl).

OBJECT OF THE INVENTION

It is an aim of this invention to provide a cleaning system which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a cleaning system for washing an internal surface of a container located on a vehicle, the cleaning system comprising:

an elongate boom with at least one nozzle located at a first end of the boom;

a support assembly for supporting the boom, wherein the boom is movable with respect to the support assembly;

a controller configured to control movement of the boom; and a vehicle identification system comprising an identification reader configured to identify the vehicle and communicate with the controller, wherein one or more parameters of the vehicle can be stored on or retrieved from the vehicle identification system upon identifying the vehicle, and wherein the boom is configured to extend into the container to wash the internal surface based on the one or more parameters.

Preferably, the boom has a plurality of nozzles located at a first end thereof. Preferably, the nozzles are located on a rotatable portion at the first end of the boom. Preferably, the nozzles are in fluid communication with a fluid pathway formed in the boom. Preferably, the fluid is water.

Preferably, the boom has a connector located at a second end thereof. Preferably, the connector is fluidically connected to a pump. Preferably, the pump is a water or pneumatic pump.

Preferably, the boom has a substantially quadrilateral cross-sectional shape. Preferably, the boom can be extended substantially into the container of the vehicle, from a distal end of the container to a proximal end of the container.

Preferably, the support assembly has a first end connected to the ground and a second end connected to and supporting the boom.

Preferably, the second end of the support assembly includes a drive assembly with a housing through which the boom extends. Preferably, the drive assembly includes a mechanism for moving the boom relative to the drive assembly. Preferably, the mechanism includes a wheel that engages with a machined surface of the boom.

Preferably, the support assembly includes a telescopic arm that is slidable into further arm. The further arm may be a fixed or immobile arm. Preferably, the drive assembly is connected to the telescopic arm. Preferably, the drive assembly is movable relative to the second end of the support assembly.

Preferably, the drive assembly is connected to a first end of an actuator. Preferably, a second end of the actuator is connected to the immobile arm of the support assembly. Preferably, the actuator is a hydraulic ram. Preferably, the drive assembly is rotatable relative to the support assembly. Preferably, the rotation of the drive assembly tilts the boom.

Preferably, a platform is located adjacent to the support assembly. Preferably, the platform includes a shelter. The shelter may be raised from a ground level, preferably to a height substantially aligned with an opening of the container, and may comprise one or more of a plurality of steps leading up to the shelter and a compartment. Preferably, the shelter is located at a height from the ground and can be accessed by the steps. Preferably, the shelter has a roof and at least one wall.

Preferably, a control panel is located in the shelter. Preferably, the control panel includes a user interface configured to allow an operator to use the cleaning system. Preferably, the user interface includes a plurality of buttons, a touch screen and/or operable levers. Preferably, the control panel is configured to allow an operator to control the boom, the telescopic arm and the actuator. Preferably, the control panel communicates with the controller and the vehicle identification system.

Preferably, steps allow access to the shelter for operating the control panel or to perform maintenance works on the controller, the support assembly or the boom. Preferably, the compartment is located at the bottom of the platform.

Preferably, the controller includes a processor. Preferably, the processor of the controller controls the movement of the boom, the drive assembly and the telescopic arm. Preferably, the processor of the controller communicates with the control panel. Preferably, the processor of the controller is located in the control panel.

Preferably, the controller further includes a boom position encoder. Preferably, the boom position encoder measures the position of the boom relative to the drive assembly. Preferably, the boom position encoder is a rotary or linear encoder. Preferably, the boom position encoder is located on the drive assembly.

Preferably, the controller further includes a height position encoder. Preferably, the height position encoder measures the position of the telescopic arm of the support assembly. Preferably, the height position encoder is a rotary or linear encoder. Preferably, the height position encoder is connected to the support assembly and the platform Preferably, a first end of the height position encoder is connected to the telescopic arm of the support assembly and a second end of the height position encoder is connected to the platform.

Preferably, the controller further includes an inclinometer. Preferably, the inclinometer measures the movement/rotation of the drive assembly relative to the support assembly. Preferably, the inclinometer records tilt of the drive assembly. Preferably, the inclinometer is located on the drive assembly.

Preferably, the vehicle identification system comprises an identification reader and a processor. Preferably, the processor of the vehicle identification system communicates with the identification reader and the controller.

Preferably, the identification reader is located on the control panel. Preferably, the identification reader is configured to read an identifier. Preferably, the identification reader is a RFID, NFC or barcode reader and the identifier is a compatible RFID, NFC or barcode tag respectively. Preferably, the identifier is encoded with a unique identification number. Preferably, the unique identification number allows the identification reader to identify the identifier. Preferably, the unique identification number read by the identification reader is stored in a memory of the processor of the vehicle identification system.

Preferably, the vehicle identification system comprises one or more cameras configured to identify the vehicle. Identification of the vehicle may comprise analysing one or more images from the one or more cameras to read a number plate or other vehicle identifier located on the vehicle. Preferably, the vehicle identification system includes a wireless receiver that communicates with a network or mobile device to identify the vehicle.

Preferably, the cleaning system includes a backstop. Preferably, the backstop assists the operator with parking the vehicle at an appropriate position for the cleaning system to operate appropriately. Preferably, the backstop is configured to align with the rear or front wheels of the vehicle. Preferably, the backstop is a L-shaped member. Preferably, the backstop is secured to the ground. Preferably, the cleaning system includes a vehicle position detection system.

In another form the invention resides in a method for washing an internal surface of a container located on a vehicle, the method comprising:
identifying the vehicle by a vehicle identification system;
retrieving one or more parameters of the vehicle stored on the vehicle identification system;
inserting a first end of an elongate boom into the container to wash the internal surface, wherein the boom is supported by a support assembly and is movable with respect to the support assembly,
wherein a controller controls movement of the boom based on the one or more parameters.

Preferably, identifying the vehicle by the vehicle identification system includes reading, by an identification reader of the vehicle identification system, a unique identification number encoded into an identifier associated with the vehicle. Preferably, the one or more parameters of the vehicle are retrieved based on the unique identification number.

Preferably, the one or more parameters are stored in a memory of a processor of the vehicle identification system. Preferably, the one or more parameters include predetermined positions of the boom. Preferably, the predetermined positions of boom are set up during an Automatic mode set-up process.

Preferably the method of setting up the predetermined positions of the boom during the Automatic mode set-up process comprises:
identifying the vehicle by a vehicle identification system;
moving the boom, by a control panel, to a first position and storing the first position in vehicle identification system; and
moving the boom, by a control panel, to a second position and storing the second position in vehicle identification system.

Preferably, in the first position, the first end of the boom is located inside the container and substantially adjacent to an opening at a distal end of the container.

Preferably, in the second position, the first end of the boom is located inside the container and substantially adjacent to a proximal end of the container. Preferably, the proximal end of the container is located opposite to the distal end of the container.

Preferably, the method of setting up the predetermined positions of the boom further comprises:
moving the boom, by a control panel, to a first intermediate position and storing the first intermediate position in vehicle identification system; and
moving the boom, by a control panel, to a second intermediate position and storing the second intermediate position in vehicle identification system,
wherein, in the first and second intermediate positions, the first end of the boom is located in between the locations of the first end of the boom in the first and second positions.

Preferably, in the first intermediate position, the first end of the boom is located between the proximal and distal ends of the container, but closer to the proximal end than the distal end of the container. Preferably, in the first intermediate position, the first end of the boom is located approximately 1 meter from the proximal end of the container.

Preferably, in the second intermediate position, the first end of the boom is located between the proximal and distal ends of the container, but closer to the distal end than the proximal end of the container. Preferably, in the second intermediate position, the first end of the boom is located approximately 1 meter from the distal end of the container.

Preferably, prior to inserting the first end of the boom into the container, the boom is moved to a default ('home') position. Preferably, in the default position, the boom is substantially parallel to the ground (not tilted), with a minimum length of the boom extending forwardly, and the boom is located at a minimum height from the ground.

Preferably, the method for washing the internal surface of the container located on the vehicle further includes:

moving the boom through an end position cycle, wherein, in the end position cycle, the boom is moved to the first position and the second position;

moving the boom through a first intermediate position cycle, wherein in the first intermediate position cycle, the boom is moved to the first position and the first intermediate position; and moving the boom through a second intermediate position cycle, wherein in the second intermediate position cycle, the boom is moved to the first position and the second intermediate position.

Preferably, the end position cycle is performed at least three times. Preferably, the second intermediate position cycle is performed at least three times.

Preferably, the cleaning system is herein as described.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

FIGS. 1-6 illustrate a cleaning system 10 for washing an internal surface of a container 30 located on a vehicle 20, according to an embodiment of the invention. The cleaning system 10 includes an elongate boom 100, a support assembly 200 for supporting the boom 100, a controller 300 for controlling movement of the boom, and a vehicle identification system 400 (not shown).

Figure 1:
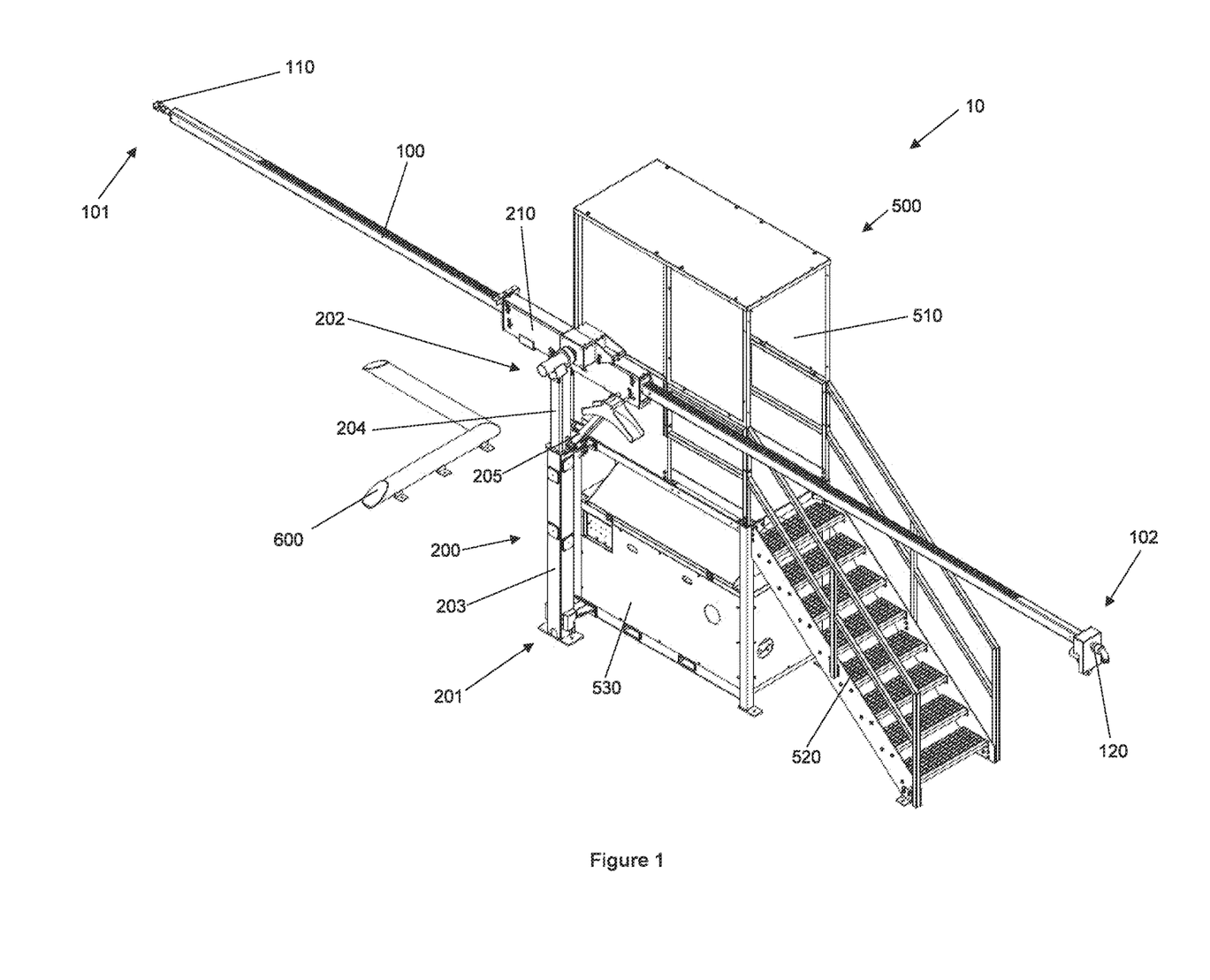
FIG. 1 illustrates perspective view of a cleaning system, according to an embodiment of the invention.

In this embodiment, the container 30 is a rotatable bowl for holding pre-mixed concrete. However, in further embodiments, the container 30 may be immobile relative to the vehicle 20 and/or may be used for holding other materials.

The boom 100 has a first end 101 and a second end 102, with the boom 100 being supported by the support assembly 200 at an intermediate portion of the boom 100 located between the first end 101 and the second end 102. A plurality of nozzles 110 are located on a rotatable portion at the first end 101 of the boom 100. The rotatable portion is actuated by hydraulics. However, in further embodiments, the rotatable portion may include a turbine which rotates due to the flow of the water, thereby resulting in rotation of the nozzles 110. Moreover, in further embodiments, the first end 101 of the boom 100 may include only one nozzle and/or one or more nozzles may be located elsewhere on the boom between the first end 101 and the second end 102. The nozzles 110 are in fluid communication with a fluid pathway formed in the boom 100 terminating at a connector 120 located at the second end 102 of the boom 100. The connector 120 may be fluidically connected to a water or pneumatic pump. Thus, fluid may enter the fluid pathway formed in the boom 100 via the connector 120 and exit via the nozzles 110. In this embodiment, the fluid used is water and is ejected from the nozzles 110 at a high pressure via a water pump. However, in further embodiments, a suitable cleaning solution or compressed air may be used. Moreover, in further embodiments, compressed air may be used to clean and/or purge the nozzles 110.

In this embodiment, the boom 100 has a substantially quadrilateral cross-sectional shape. However, in further embodiments, the boom 100 may have a different cross-sectional shape, for example, circular or elliptical, or an irregular cross-sectional shape. The length of the boom 100 is selected such that the boom 100 can be extended substantially into the container 30 of the vehicle 20, from a distal end 31 to a proximal end 32 of the container.

The support assembly 200 has a first end 201 securely connected to the ground and a second end 202 connected to and supporting the boom 100. However, in further embodiments, the support assembly 200 may be located at a certain distance above the ground and the first end 201 of the support assembly 200 may be connected to another structure.

The second end 202 of the support assembly 200 includes a drive assembly 210 with a housing through which the boom 100 extends. The drive assembly 210 includes an appropriate drive mechanism, in the form of a wheel that engages with a machined surface of the boom, that moves the boom 100 forward or backward relative to the drive assembly 210, thereby allowing the length of the boom 100 that extends beyond the housing of the drive assembly 210 to be adjusted depending on the dimensions of the container 30 of the vehicle 20. The drive assembly 210 itself can be moved upward or downward relative to the second end 202 of the support assembly 200 as it is located on a telescopic arm 204 of the support assembly 200 that is slidable into an immobile arm 203. However, in further embodiments, a different mechanism, for example, hydraulic or pneumatic rams and/or scissor arms, may be used to move the drive assembly 210 relative to the rest of the support assembly 200.

The drive assembly 210 is also connected to one end of an actuator 205 in the form of a hydraulic ram, with other end of the actuator 205 being connected to the immobile arm 203 of the support assembly 200. This arrangement allows the drive assembly 210 to rotate relative to the rest of the support assembly 200, thereby tilting the boom 100. However, in further embodiments, a different mechanism may be used to rotate the drive assembly, for example, a motor that rotates the portion of the drive assembly 210 that is connected to the telescopic arm 204 of the support assembly 200, a pneumatic ram etc.

A platform 500 is located adjacent to the support assembly 200 and includes a shelter 510, a plurality of steps 520 leading up to the shelter 510, and a compartment 530. The shelter 510 is located at a height from the ground and can be accessed via the steps 520. A control panel 310 is located in the shelter 510 such that it is substantially protected against rain or other weather phenomena by the roof and walls of the shelter 510. However, in further embodiments, the platform 500 may be located at a distance from the support assembly 200 or the control panel 310 may be located elsewhere, for example, on or adjacent to the support assembly 200 or at a distance from the support assembly 200. The steps 520 allow access to the shelter 510 for operating the control panel 310 or to perform maintenance works on the controller 300, the support assembly 200 or the boom 100.

The compartment 530 is located at the bottom of the platform 500 and provides an enclosure for various components such as pumps, controllers, or spare parts.

Figure 2A:
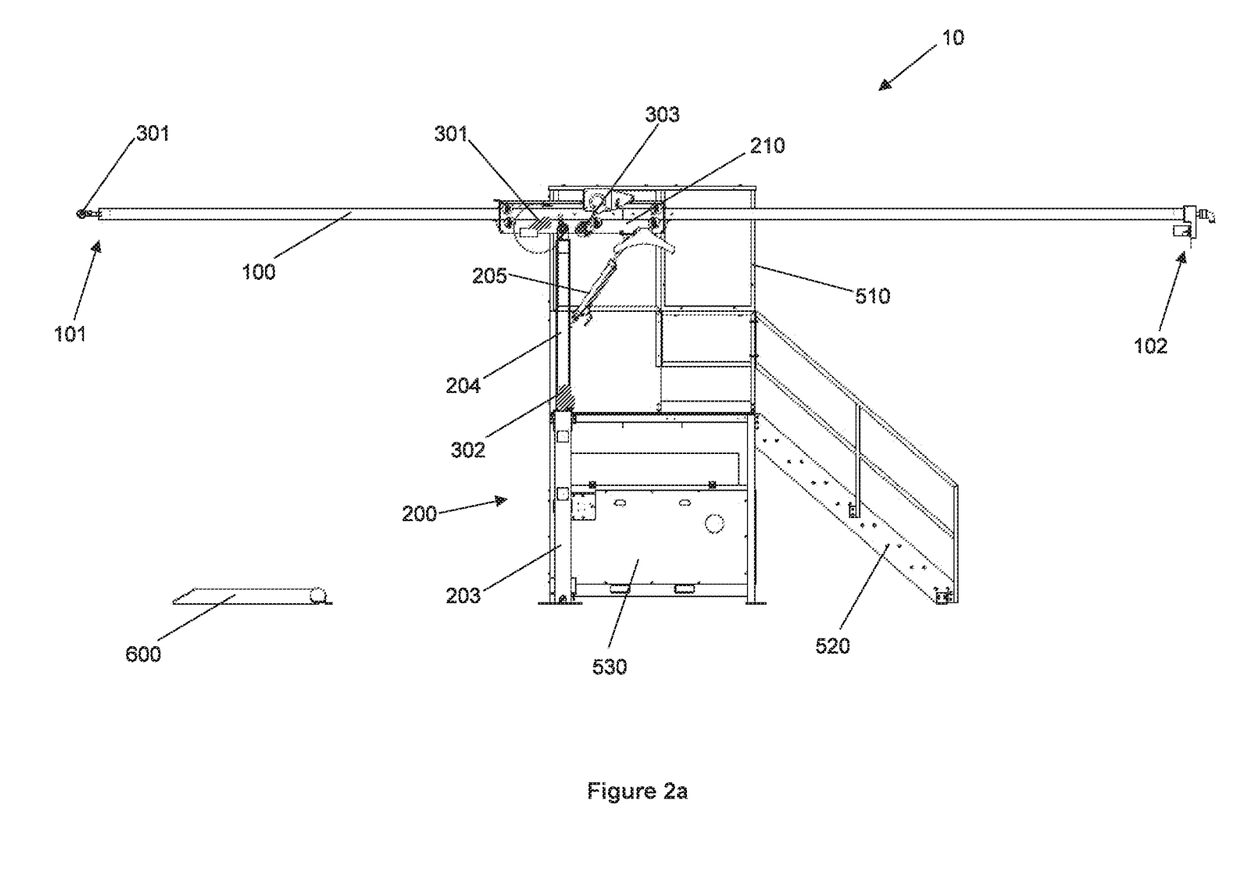
FIG. 2a illustrates a side view of the cleaning system shown in FIG. 1.
Figure 2B:
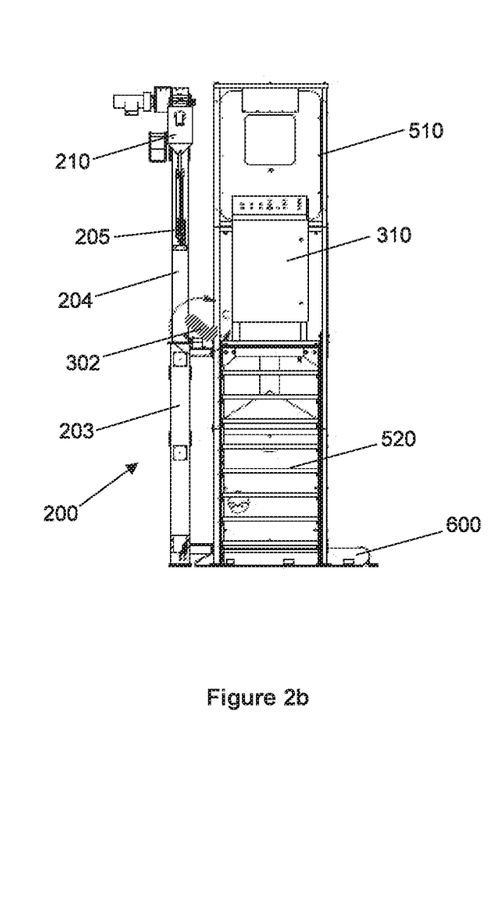
FIG. 2b illustrates an end view of the cleaning system shown in FIG. 1.
Figures 2C, 2D, 2E:
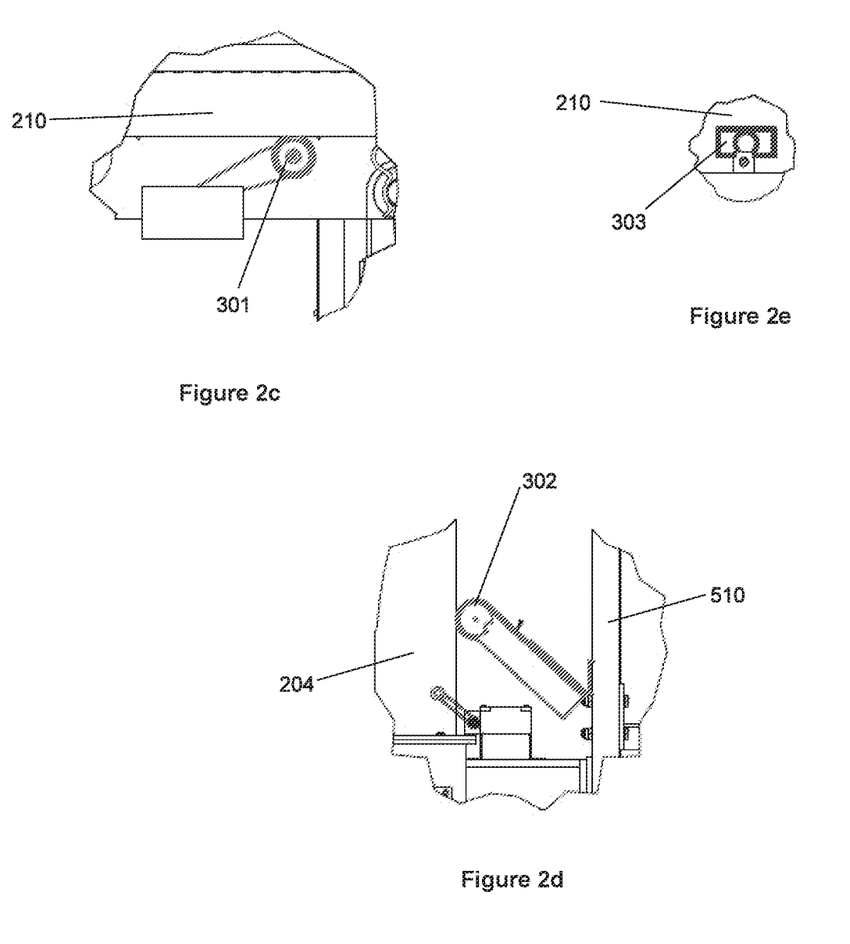
FIGS. 2c-2d illustrate partial views of the support assembly of the cleaning system shown in FIG. 1, showing the boom position encoder, the inclinometer and the height position encoder in detail.

The controller 300 includes a processor 320 (not shown) that is located in the control panel 310, a boom position encoder 301, a height position encoder 302 and an inclinometer 303. The processor 320 of the controller 300 controls the movement of the boom 100, the drive assembly 210 and the telescopic arm 204 of the support assembly 200, and communicates with the control panel 310. However, in further embodiments, the processor 320 may be located elsewhere and still communicate with the control panel 310, for example, in the compartment 530 or on the support assembly 200. The processor 320 also communicates with the boom position encoder 301, the height position encoder 302, the inclinometer 303 and the vehicle identification system 400.

The boom position encoder 301 and the inclinometer 303 are located on the drive assembly 210, while the height position encoder 302 is located between the support assembly 200 and the platform 500 with one end of the height position encoder 302 connected to the telescopic arm 203 and other end connected to the platform 500. The boom position encoder 301 and the height position encoder 302 are rotary encoders that record the position of the boom 100 (relative to the drive assembly) and the telescopic arm 203 of the support assembly 200 respectively. The inclinometer 303 records the tilt of the drive assembly 210 (and therefore the boom 100). However, in further embodiments, the boom position encoder 301 and the height position encoder 302 may be linear encoders, the tilt of the drive assembly 210 may be recorded via a rotary encoder, or the position of the boom 100 and telescopic arm 203 and the tilt of the drive assembly 210 may be recorded through other types of devices.

The control panel 310 includes a user interface with a plurality of buttons that allow an operator to use the cleaning system 10 by controlling the movement of the boom 100, the telescopic arm 204 and the actuator 205. However, in further embodiments, the user interface may be in the form of a touch screen and/or operable levers, with or without buttons. The user interface is configured to communicate with the controller 300 and the vehicle identification system 400.

The vehicle identification system 400 comprises an identification reader 410 located on the control panel 310, and a processor 420 (not shown). The processor 420 of the vehicle identification system 400 communicates with the identification reader 410 and the processor 320 of the controller 300. The identification reader 410 is in the form of a RFID (Radio frequency identification) reader that can read a compatible identifier 450 (not shown) in the form of a RFID tag and output a signal to the processor 420. Each identifier 450 in encoded with a unique identification number that allows the identification reader 410 to identify which identifier 450 is being read. This unique identification number is also communicated to the processor 420 by the identification reader 410 and can be stored on the memory of the processor 420.

However, in further embodiments, each identifier 450 may be a NFC (Near Field Communication) tag or a barcode, with the identification reader 410 being a NFC reader or a barcode reader respectively. Alternatively, the vehicle identification system 400 may comprise of cameras that are configured to identify the vehicle 20 based on its physical parameters or number plate, and/or the vehicle identification system 400 may include a wireless receiver that communicates wirelessly with a network or a mobile device to receive information regarding the identity of the vehicle 20 and/or to communicate with the processor 420. The wireless receiver may also be able to communicate with the controller 300.

A backstop 600 is used with the cleaning system 10 to assist the operator of the vehicle 20 with parking the vehicle 20 at the correct position for the cleaning system 10 to operate appropriately. The operator is required to align the rear or front wheels of the vehicle 20 with the backstop to ensure that the vehicle 20 is in the correct position. The backstop 600 is in the form of a L-shaped member that is firmly secured to the ground. However, in further embodiments, the backstop 600 may be differently shaped, for example, linear or U-shaped, or a different system may be used in place of the backstop 600, for example, a vehicle position detection system or a proximity sensor.

FIGS. 3-6 illustrate the cleaning system 10 in use with a vehicle 20. The cleaning system 10 can be operated in two different modes—Manual or Automatic—which can be selected by the operator from the control panel 310. To use the cleaning system 10 in the Manual mode, the cleaning system 10 is first switched on, the Manual mode is selected and the cleaning process is started by pushing a 'start' button. The operator can then adjust the position of the boom (height, extension and tilt) by pushing appropriate buttons on the control panel 310 to achieve the desired position of the first end 101 of the boom 100 inside the container 30 (as seen in FIGS. 3-6). The operator can also start the flow of water through the nozzles 110 by pushing the appropriate button for switching on the water pump. Notably, the position of the boom can be adjusted by the operator even while the water pump is switched on. When the container 30 has been cleaned, the cleaning system 10 can be switched off by the user by pushing the appropriate button on the control panel 310. However, in further embodiments, use of the cleaning system 10 in the Manual mode may be locked and accessible only by use of a key.

Figure 7:
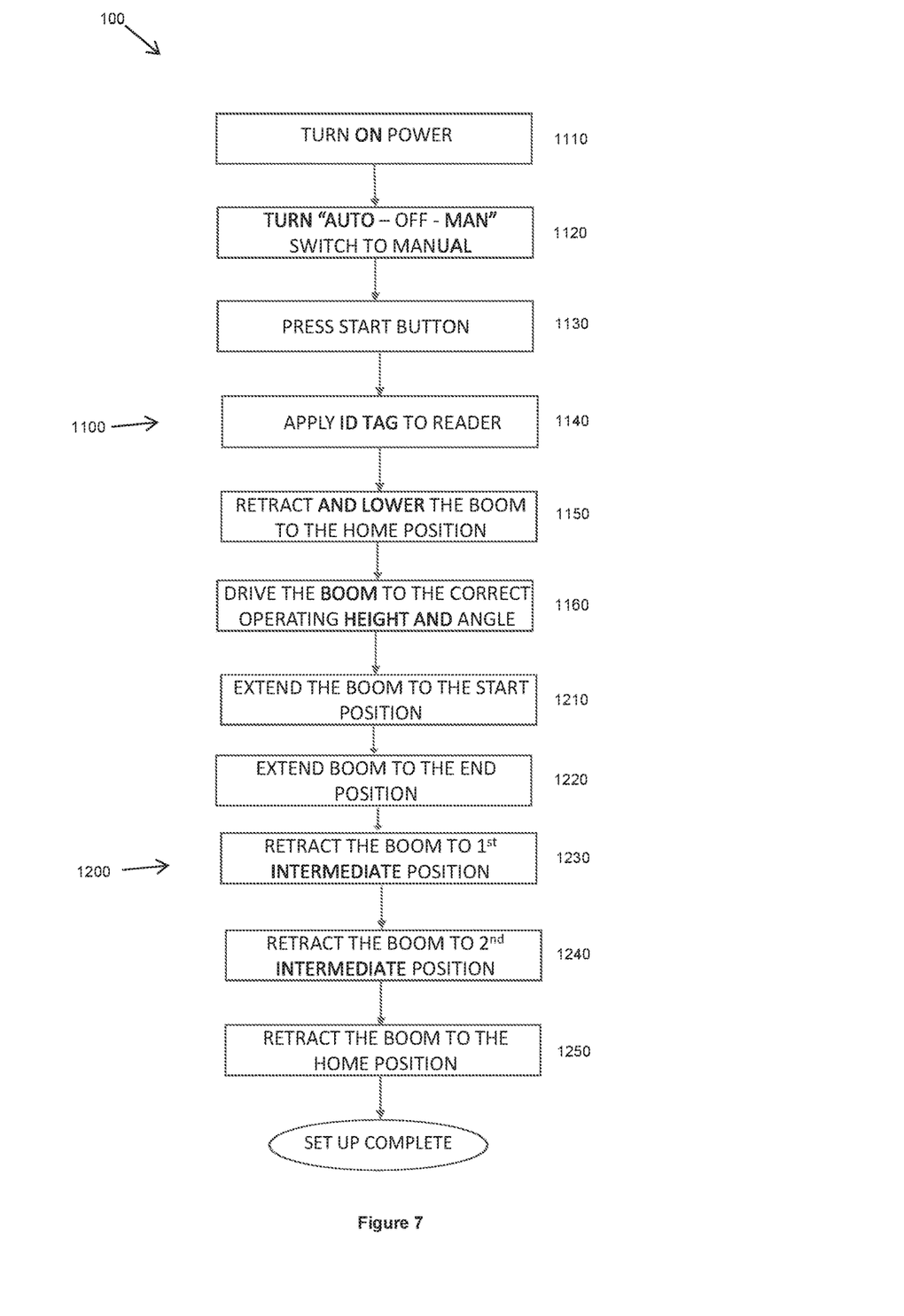
FIG. 7 illustrates the steps of the 'Automatic mode set-up' process 100 undertaken on the cleaning system shown in FIG. 1.

Prior to operating the cleaning system 10 in the Automatic mode, the relevant parameters for each vehicle 20, i.e the desired configurations/positions of the boom 100 for each vehicle 20 need to be programmed and stored in the memory of the processor 420 of the vehicle identification system 400. FIG. 7 illustrates the steps involved in this 'Automatic mode set-up' process 100, which broadly includes activation steps 1100 and initialization steps 1200. At steps 1110-1130, the cleaning system 10 is first switched on, the Manual mode is selected and the cleaning process is started by pushing a 'start' button. At step 1140, the operator places the identifier 450 on or in close proximity to the identification reader 410 on the control panel 310 so that the identification reader 410 may read the unique identification number encoded into the identifier 450 and identify the vehicle 20 with which the unique identification number is associated. This information is also communicated to the controller 300 so that the parameters, i.e. desired positions of the boom that are set up in the initialization steps 1200 are associated with and stored against the particular vehicle 20 whose associated unique identification number was read from the identifier 450. However, in further embodiments, the identifier 450 may be read prior to the cleaning system 10 being turned on.

Figure 3:
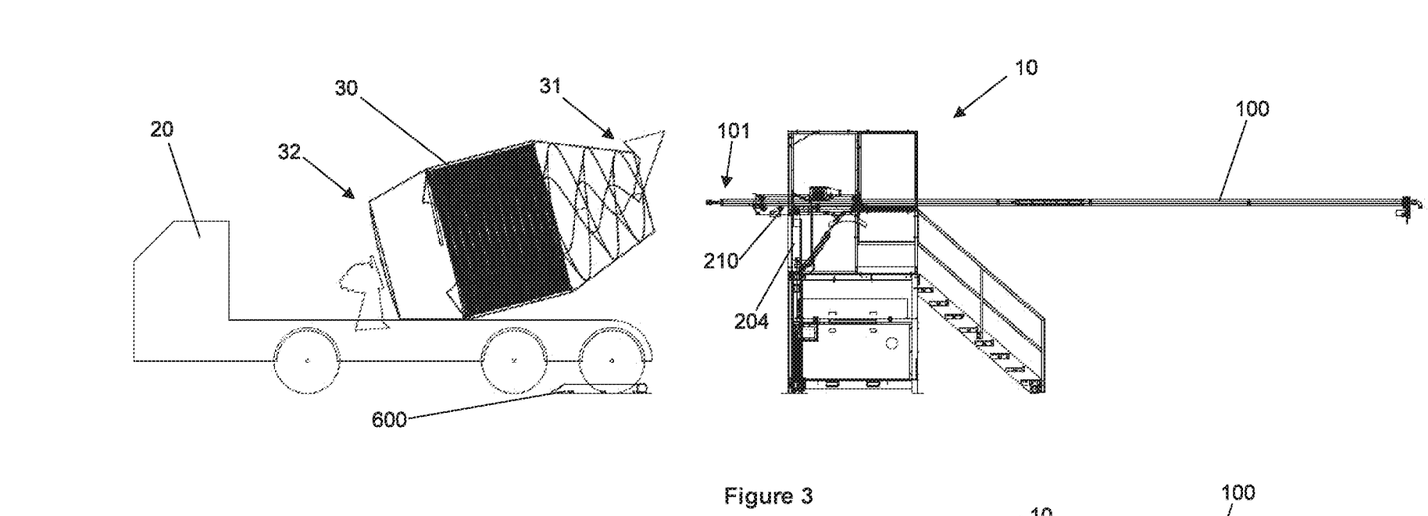
FIGS. 3-6 illustrate various configurations/positions of the boom of the cleaning system shown in FIG. 1.
Figure 4:
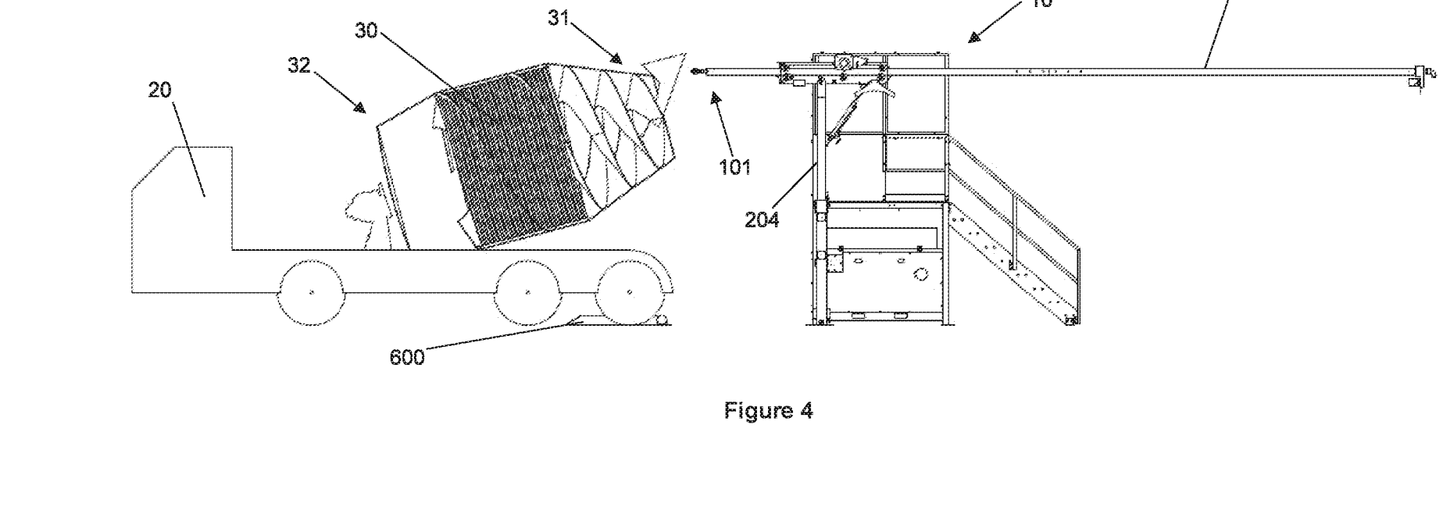
Figure 5:
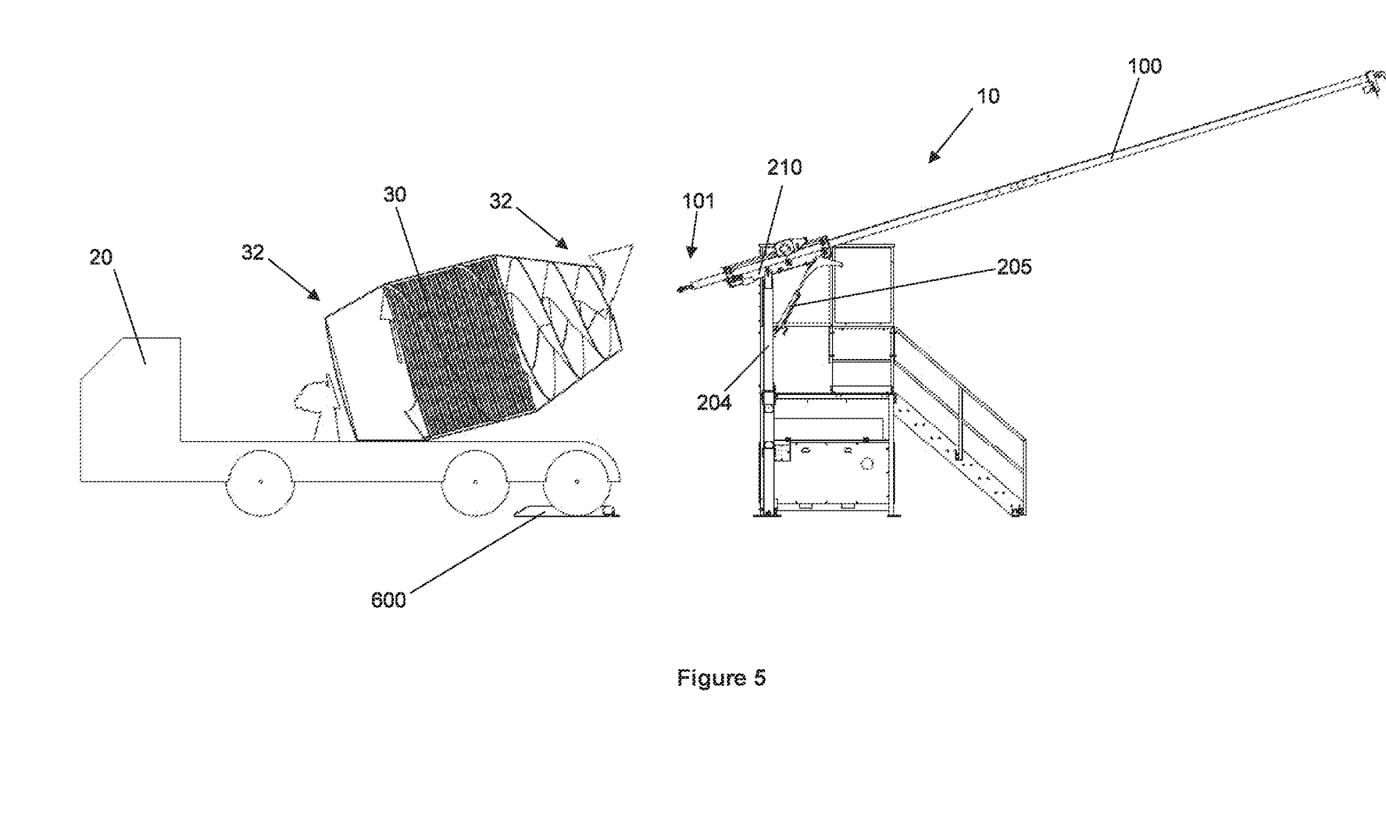
Figure 6:
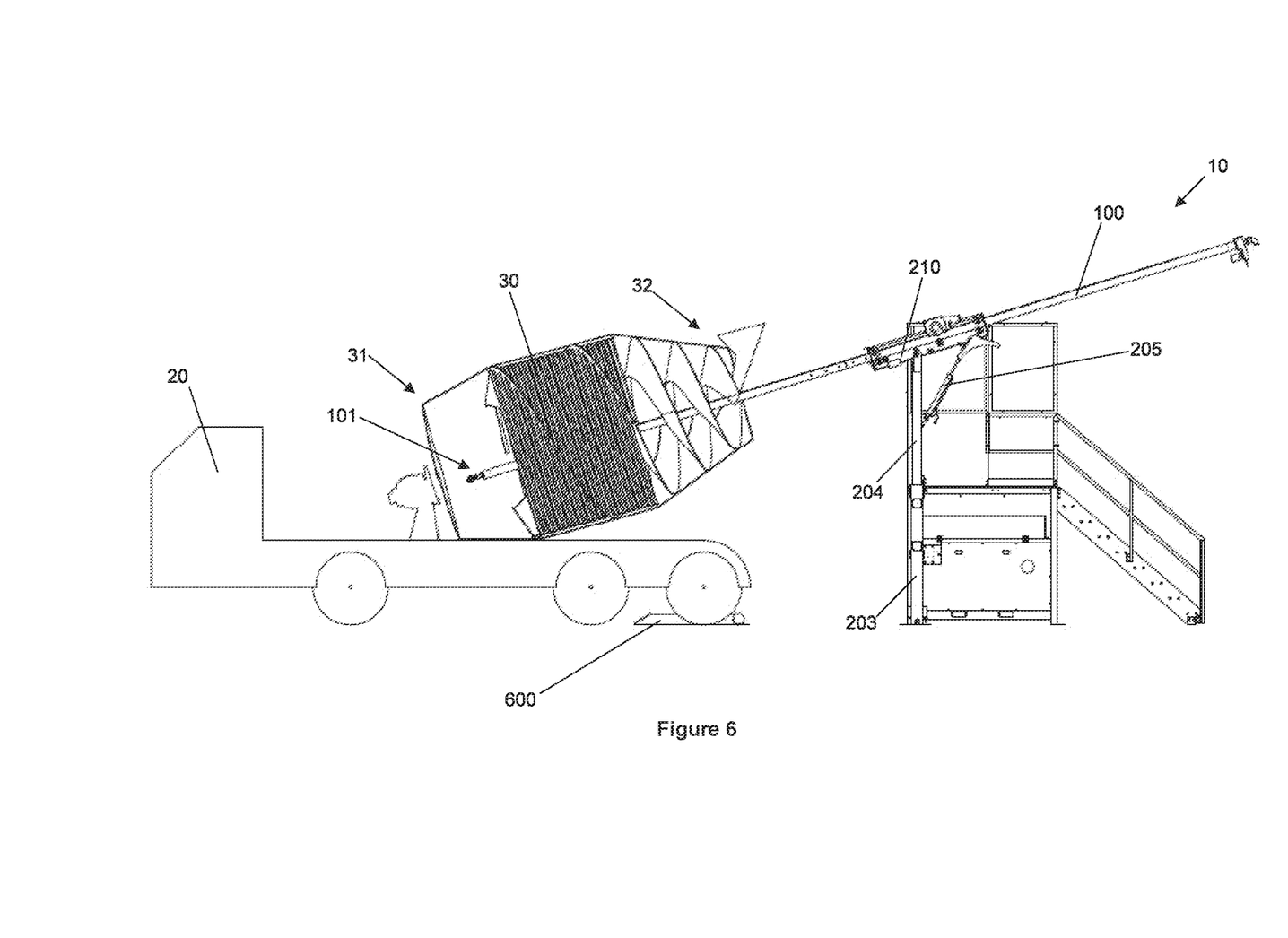

Next, at step 1150, the operator moves the boom 100 (by pushing appropriate buttons on the control panel 310) to the 'home' position, i.e. when the boom 100 is parallel to the ground (not tilted) with a minimum length of the boom 100 extending forwardly from the drive assembly 210, and a minimum length of the telescopic arm 204 extending from the immobile arm 203 (as seen in FIG. 3). The operator then, at step 1160, moves the boom 100 to an appropriate height (as seen in FIG. 4) for entering the container 30 (by moving the telescopic arm 203) and tilts the boom 100 (as seen in FIG. 5) to an angle corresponding with an angle of tilt of the container 30 (by tilting the drive assembly 210 via the actuator 205). At the end of step 1160, the cleaning system 10 is ready to be programmed with the desired positions of the boom 10 (initialization steps 1200) for the particular vehicle 20 whose associated unique identification number was read from the identifier 450.

Firstly, at step 1210, the boom 100 is extended to a 'start' position such that the first end 101 of the boom 100 is located inside the container 30 but substantially adjacent to the opening of the container 30 at its distal end 31. This position of the boom is stored in the memory of the processor 420 of the vehicle identification system 400 by pushing an appropriate button on the control panel 310. Next, at step 1220, the boom 100 is extended to an 'end' position where the first end 101 of the boom 100 is located substantially adjacent to the proximal end 32 of the container 30, opposite to the distal end 31 with the opening. This 'end' position of the boom 100 is also stored in the memory of the processor 420 of the vehicle identification system 400.

Subsequently, at step 1230, the boom 100 is partially retracted towards the distal end 31 of the container 30 to a first intermediate position such that the first end 101 of the boom 100 is located between the distal end 31 and proximal end 32 of the container 30 but closer to the proximal end 32 than the distal end 31 of the container 30. This first intermediate position of the boom 100 is stored in the memory of the processor 420 of the vehicle identification system 400 by pushing an appropriate button on the control panel 310. Similarly, at step 1240, a second intermediate position of the boom 100 is stored in the memory of the processor 420 of the vehicle identification system 400 (by pushing an appropriate button on the control panel 310) by further partially retracting the boom 100 towards the end 31 of the container 30 to the second intermediate position such that the first end 101 of the boom 100 is located between the distal end 31 and proximal end 32 of the container 30 but closer to the distal end 31 than the proximal end 32 of the container 30.

In this embodiment, the distance between the first intermediate position and the proximal end 32 of the container 30 is approximately 1 meter and the distance between the second intermediate position and the distal end 31 of the container 30 is also approximately 1 meter. However, in further embodiments, the cleaning system 10 may require no intermediate positions or only one or three or more intermediate positions to be set up for the cleaning system 10 to be operated in the Automatic mode. Moreover, in further embodiments, the distance between the first and/or second intermediate positions and the distal and/or proximal ends of the container 30 may vary depending on the size, shape, type etc of the container 30.

Finally, at step 1250, the boom 100 is retracted to the 'home' position (similar to step 1150), i.e. when the boom 100 is parallel to the ground (not tilted) with a minimum length of the boom 100 extending forwardly from the drive assembly 210, and a minimum length of the telescopic arm 204 extending from the immobile arm 203 (as seen in FIG. 3). This concludes the 'Automatic mode set-up' process 100 for the particular vehicle 20 whose associated unique identification number was read from the identifier 450 and the relevant parameters for the vehicle 20 are saved on the memory of the processor 420 of the vehicle identification system 400.

To use the cleaning system 10 in the Automatic mode (after completion of the 'Automatic mode set-up' process 100), the cleaning system 10 is first switched on, the Automatic mode is selected and the cleaning process is started by pushing a 'start' button. Next, the operator places the identifier 450 on or in close proximity to the identification reader 410 on the control panel 310 so that the identification reader 410 may read the unique identification number encoded into the identifier 450 and identify the vehicle 20 with which the unique identification number is associated. This information enables the parameters (pre-set positions of the boom that were set up in the 'Automatic mode set-up' process 100) associated with the particular vehicle 20, whose associated unique identification number was read from the identifier 450, to be retrieved from the memory of the processor 420 of the vehicle identification system 400 and communicated to the controller 300.

After the identifier 450 has been read by the identification reader 410, the controller 300 moves the boom 100 to the 'home' position, i.e. when the boom 100 is parallel to the ground (not tilted) with a minimum length of the boom 100 extending forwardly from the drive assembly 210, and a minimum length of the telescopic arm 204 extending from the immobile arm 203 (as seen in FIG. 3). Once the boom 100 has been retracted to the 'home' position, the relevant parameters for the vehicle 20 saved in the processor 420 of the vehicle identification system 400 are retrieved and the boom 100 is extended (by the controller 300) to the 'start' position that was set-up at step 1210 of the 'Automatic mode set-up' process 100, such that the first end 101 of the boom 100 is located inside the container 30 (of the vehicle 20 whose associated unique identification number was read from the identifier 450) but substantially adjacent to the opening of the container 30 at its distal end 31. However, in further embodiments, the boom 100 may not be moved to the 'home' position prior to being moved to the 'start' position, and may instead be moved to the 'start' position directly from whatever position the boom 100 is already in.

When the boom 100 has been extended to the 'start' position, the controller 300 switches on the water pump, which results in the flow of water through the nozzles 100, and the rotatable portion on which the nozzles 100 are located begins to rotate. After a predetermined time (approximately 10 seconds) to allow the water pressure to build up, the boom 100 is extended by the controller 300 to the 'end' position that was set-up at step 1220 of the 'Automatic mode set-up' process 100, such that the first end 101 of the boom 100 is located substantially adjacent to the proximal end 32 of the container 30. Next, the boom 100 is retracted back to the 'start' position by the controller 300 and this 'end' position cycle ('start' position—'end' position—'start' position) is repeated a further two times.

Next, the boom 100 is moved to the first intermediate position (as set-up at step 1230 of the 'Automatic mode set-up' process 100) by the controller 300 from the 'start' position, and then retracted back to the 'start' position (first intermediate position cycle).

Subsequently, the boom 100 is moved to the second intermediate position (as set-up at step 1240 of the 'Automatic mode set-up' process 100) by the controller 300 from the 'start' position, and then retracted back to the 'start' position, with this second intermediate position cycle ('start' position—second intermediate position—'start' position) being repeated a further two times.

When all of the above cycles have been completed, the boom 100 will remain at the 'start' position for a predetermined time (approximately 20 seconds) before the water pump is switched off by the controller 300.

Finally, approximately 10 seconds after the water pump is switched off, the controller 300 moves the boom 100 to the 'home' position (as seen in FIG. 3). The cleaning system 10 then switches off automatically.

In further embodiments, in the Automatic mode, the cleaning system 10 may perform each cycle ('end' position cycle, first intermediate position cycle and second intermediate position cycle) only once, or may perform each cycle any number of times (with each cycle being performed the same or different number of times). Further, the cycles performed and the positions included in each cycle may vary depending on the number of positions set-up in the 'Automatic mode set-up' process 100. Moreover, the cleaning system 10 may allow the operator to select the frequency of each cycle prior to the Automatic mode being initiated.

When the cleaning system 10 is operating in the Automatic mode or when the 'Automatic mode set-up' process 100 is being performed, the extension of the boom 100, the tilt of the boom 100 and the position of the telescopic arm 203 of the support assembly 200 are continuously recorded by the boom position encoder 301, the inclinometer 303 and the height position encoder 302 respectively and the data is conveyed to the processor 320 of the controller 300. Further, any deflection of the first end 101 of the boom 100 as the boom 100 is extended into the container 30 can be measured and compensated for by the controller 300 so that the boom 100 follows a predetermined and substantially central path inside the container 30 and no part of the boom 100 comes into physical contact with any portion of the container 30 (including any other components located on the inside on the container 30).

The cleaning system 10, that can be operated in an Automatic mode, presents several advantages over cleaning systems that can only be operated manually. Notably, the cleaning system 10 does not require an operator to control the movement of the boom 100 during the cleaning process (in Automatic mode), thereby eliminating the possibility of human error (that may lead to damage to the boom 100 or the container 30) and providing consistent results. Moreover, due to the various positions and orientations that the boom 100 can be moved to, the cleaning system 10 can be used with different types of vehicles with varying sizes and orientations of the containers.

The vehicle identification system 400 and the 'Automatic mode set-up' process 100 of the cleaning system 10 also allow an operator to set-up the desired positions of the boom 100 relative to the container 30 of the vehicle 20 and, once these positions have been set, an operator is only required to have the identifier 450 read by the identification reader 410 of the vehicle identification system 400 to have the container 30 automatically cleaned by the cleaning system 10. Thus, the cleaning system 10 greatly reduces the input required from an operator and ensures a thorough clean of the container 30 without requiring the operator to control the boom 100 during the cleaning process.

In this specification, adjectives such as first and second, forward and backward, upward and downward, top and bottom, proximal and distal, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A cleaning system for washing an internal surface of a container located on a vehicle, the cleaning system comprising:
   an elongate boom with at least one nozzle located at a first end of the boom;
   a support assembly for supporting the boom, the support assembly including a telescopic arm slidable into an immobile arm, and a drive assembly directly connected to the telescopic arm, wherein the boom is movable with respect to the support assembly;
   a controller configured to control movement of the boom; and
   a vehicle identification system comprising an identification reader configured to identify the vehicle and communicate with the controller, the identification reader being configured to read an identifier encoded with a unique identification number, the identifier being associated with the vehicle,
      wherein one or more parameters of the vehicle are retrieved from the vehicle identification system upon identifying the vehicle, the one or more parameters including predetermined positions of the boom,
      wherein the boom is configured to extend into the container to wash the internal surface based on the one or more parameters,
      wherein the predetermined positions of the boom are set up and stored on the vehicle identification system during an Automatic mode set-up process,
      wherein the drive assembly includes a housing through which the boom extends and a mechanism configured to move the boom relative to the drive assembly, and
      wherein the drive assembly is directly connected to a first end of an actuator configured to rotate the drive assembly relative to the telescopic arm, a second end of the actuator being directly connected to the immobile arm.

2. The cleaning system of claim 1, wherein the boom can be extended into the container of the vehicle, from a distal end of the container to a proximal end of the container.

3. The cleaning system of claim 1, wherein the controller includes a boom position encoder configured to measure a position of the boom relative to the drive assembly, and/or wherein the controller includes a height position encoder configured to measure a position of the telescopic arm of the support assembly.

4. The cleaning system of claim 1, wherein the controller includes an inclinometer configured to measure movement and/or rotation of the drive assembly relative to the support assembly.

5. The cleaning system of claim 1, wherein the identification reader is configured to read an identifier encoded with a unique identification number, the identifier being associated with the vehicle.

6. The cleaning system of claim 5, wherein the identification reader is a RFID, NFC or barcode reader and the identifier is a compatible RFID, NFC or barcode tag respectively.

7. The cleaning system of claim 1, wherein a platform is located adjacent to the support assembly, the platform including a shelter with a control panel located therein.

8. The cleaning system of claim 1, wherein the cleaning system includes a backstop configured to assist an operator with parking the vehicle at an appropriate position for the cleaning system to operate, wherein the backstop is configured to align with rear or front wheels of the vehicle.

9. The cleaning system of claim 1, wherein the cleaning system includes a control panel that includes a user interface and is configured to allow an operator to control the movement of the boom.

10. The cleaning system of claim 7, the control panel is configured to communicate with the controller and the vehicle identification system.

11. A method for washing an internal surface of a container located on a vehicle, the method comprising:
identifying the vehicle by a vehicle identification system;
retrieving one or more parameters of the vehicle stored on the vehicle identification system, the one or more parameters including predetermined positions of an elongate boom;
inserting a first end of the elongate boom into the container to wash the internal surface, wherein the boom is supported by a support assembly and is movable with respect to the support assembly, the support assembly including a telescopic arm slidable into an immobile arm, and a drive assembly directly connected to the telescopic arm,
wherein a controller controls movement of the boom based on the one or more parameters,
wherein identifiying the vehicle by the vehicle identification system includes reading, by an identification reader of the vehicle idenfitication system, a unique identification number encoded into an identifier associated with the vehicle,
wherein the predetermined positions of the boom are set up and stored on the vehicle identification system during an Automatic mode set-up process,
wherein the drive assembly includes a housing through which the boom extends and a mechanism configured to move the boom relative to the drive assembly, and
wherein the drive assembly is directly connected to a first end of an actuator configured to rotate the drive assembly relative to the telescopic arm, a second end of the actuator being directly connected to the immobile arm.

12. The cleaning system of claim 1, wherein the controller is configured to measure and compensate for deflection of the first end of the boom as the boom is extended into the container.

13. The method of claim 11, wherein the one or more parameters of the vehicle are retrieved based on the unique identification number.

14. The method of claim 11, wherein setting up the predetermined positions of the boom during the Automatic mode set-up process comprises:
identifying the vehicle by the vehicle identification system;
moving the boom, by a control panel, to a first position and storing the first position in vehicle identification system; and
moving the boom, by the control panel, to a second position and storing the second position in vehicle identification system.

15. The method of claim 14, wherein, in the first position, the first end of the boom is located inside the container and adjacent to an opening at a distal end of the container, and
wherein, in the second position, the first end of the boom is located inside the container and substantially adjacent to a proximal end of the container.

16. The method of claim 14, wherein setting up the predetermined positions of the boom further comprises:
moving the boom, by the control panel, to a first intermediate position and storing the first intermediate position in vehicle identification system; and
moving the boom, by the control panel, to a second intermediate position and storing the second intermediate position in vehicle identification system,
wherein, in the first and second intermediate positions, the first end of the boom is located in between the locations of the first end of the boom in the first and second positions.

17. The method of claim 16, wherein, in the first intermediate position, the first end of the boom is located between the proximal and distal ends of the container, but closer to the proximal end than the distal end of the container, and
wherein, in the second intermediate position, the first end of the boom is located between the proximal and distal ends of the container, but closer to the distal end than the proximal end of the container.

18. The method of claim 11, wherein inserting the first end of the elongate boom into the container to wash the internal surface includes performing a 'start' position cycle, the 'start' position cycle comprising:
moving the boom to a first position, wherein, in the first position, the first end of the boom is located inside the container and adjacent to an opening at a distal end of the container,
moving the boom to a second position from the first position, wherein, in the second position, the first end of the boom is located inside the container and substantially adjacent to a proximal end of the container, and
moving the boom to the first position from the second position.

* * * * *